United States Patent [19]

Wolfe

[11] Patent Number: 4,736,818
[45] Date of Patent: Apr. 12, 1988

[54] RAIL LUBRICATING DEVICE

[76] Inventor: Robert A. Wolfe, 114 Skyline Dr., Joplin, Mo. 64801

[21] Appl. No.: 883,554

[22] Filed: Jul. 9, 1986

[51] Int. Cl.$^4$ ............................................... B61K 3/00
[52] U.S. Cl. ..................................... 184/3.2; 239/161; 239/166
[58] Field of Search ................... 184/3.1, 3.2; 104/279, 104/307, 1 R; 198/500; 239/160, 161, 162, 166, 167

[56] References Cited

U.S. PATENT DOCUMENTS

| | | | |
|---|---|---|---|
| 1,307,498 | 6/1919 | Johnson | 184/3.2 |
| 1,701,549 | 2/1929 | Weedon et al. | 184/3.2 |
| 2,586,256 | 2/1952 | Quarles | 184/3.2 |
| 3,386,660 | 6/1968 | Marriam | 239/167 X |
| 3,542,153 | 11/1970 | Phillips et al. | 184/3.1 |

*Primary Examiner*—Leonard E. Smith
*Attorney, Agent, or Firm*—Kokjer, Kircher, Bradley, Wharton, Bowman & Johnson

[57] ABSTRACT

A device for lubricating rails is mounted on a track maintenance truck. A pair of heated grease cannisters are mounted in the truck bed along with an air compressor for powering the pneumatic components of the lubricator. A pair of applicator arms have nozzles which apply the grease in a bead to the rails. Valves operated by pneumatic cylinders control the flow of grease to the applicator arms. A special frame attached to the rail gear on the rear bumper of the truck rotatively supports a pair of coaxial shafts on which the arms are carried. Independent pneumatic cylinders rotate the shafts to move the applicator arms between a lowered operating position for applying grease and a raised position in which the arms extend horizontally when not in use. Each arm can be manually moved to and latched in an upright position for over the road travel of the truck.

1 Claim, 2 Drawing Sheets

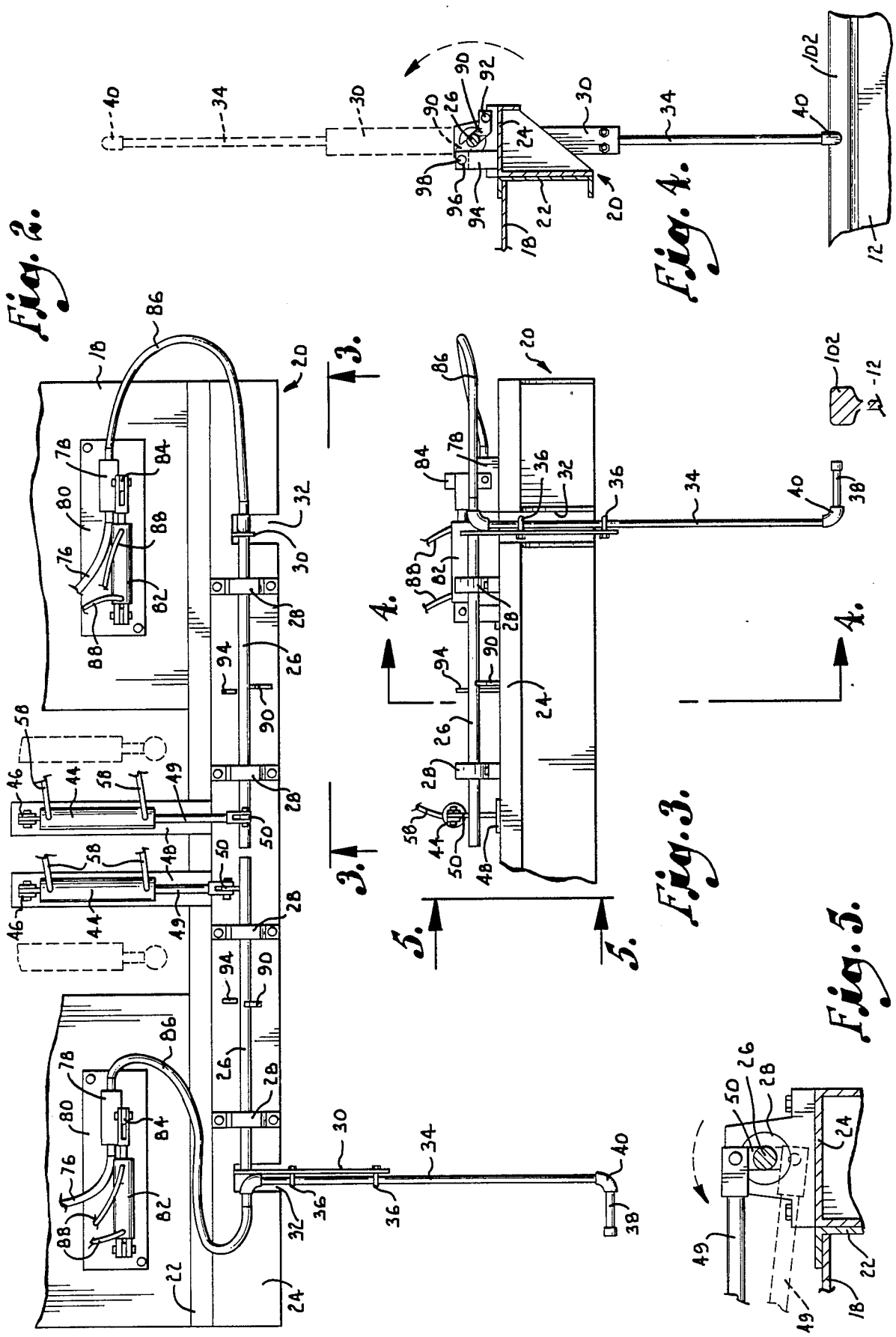

RAIL LUBRICATING DEVICE

BACKGROUND OF THE INVENTION

This invention relates in general to the lubrication of rails and more particularly to a mobile lubricating device which serves to apply grease to the rails of railroad track.

It has long been known that the application of lubricant to railroad tracks can significantly reduce the wear on both the railcar wheels and on the rails. Lubrication also can result in significant fuel savings for the locomotives. The friction is greatest on curves, and lubrication is thus most effective when applied to curved areas of the track. In the past, the conventional practice has been to use stationary wayside lubricating devices for the application of lubricant. The wayside lubricator pumps grease onto the flange of the rail at a selected location and relies on the wheels of the train to spread the grease along the entire curved area of the track. As can easily be appreciated, a large part of the grease (typically 40%) is essentially wasted because it is thrown off of the rail by the wheels. Consequently, the lubricant is applied in an uneconomical manner by the way side lubricators. In addition, each curve that requires lubrication must be equipped with a separate lubricating device, and a large number of lubricators are thus required along a given stretch of track.

Due in large part to these shortcomings associated with wayside lubricators, various types of mobile lubricating units have been proposed in the past. One approach that has been proposed is to provide a special vehicle which is used to apply the lubricant. This is a high cost system because it requires a dedicated vehicle which must be specially constructed and which is capable only of lubricating rails. Adding to the cost is the need for at least one worker to operate the vehicle and the lubricating equipment.

Another device that has been proposed is a trailer mounted lubricator that is towed behind a conventional track maintenance vehicle. The need for a specially constructed trailer on which to carry the lubricating device results in a high cost for this device also. Moreover, the trailer must be attached to and detached from the towing vehicle from time to time, and it must be stored when not in use.

Another type of lubricator that has been proposed is mounted to the rail gear that is carried on a track maintenance vehicle. This has the advantage of allowing the device to apply lubricant during routine track inspections, thus avoiding the need to make additional trips for the purpose of lubricating the track. However, the only known device of this type includes applicator nozzles that are carried low to the ground at a fixed position and cannot be adjusted to get them out of the way when not in use. As a consequence, the nozzles are highly susceptible to damage caused by obstacles that may be encountered, particularly if the maintenance truck should derail. The grease is highly viscous in cold weather and flows so poorly that cold weather lubrication is either not possible at all or is at best carried out slowly and with less effectiveness than is achieved in warmer weather.

SUMMARY OF THE INVENTION

The present invention is directed to a mobile lubricator for rails which is improved in a number of respects in comparison to the lubrication devices that have been proposed in the past. In accordance with the invention, the components which apply lubricant to the rails are mounted on a special frame secured to the existing rail gear of a conventional track maintenance truck. Mounted in the bed of the truck are large grease cannisters and an air compressor that provides operating power for the system.

The grease is applied by a pair of applicator arms that can be pivoted between a lowered operating position and a raised travel position. In the operating position, a nozzle on the end of each arm is located adjacent the inside edge of the corresponding rail flange. When a valve controlled by a pneumatic cylinder is opened, the grease flows from the cannister to the nozzle and is discharged onto the rail flange in a uniform bead. When the applicator arms are raised, they extend horizontally behind the rail gear, and the vehicle can travel along the track without subjecting the arms to damage.

Each applicator arm has yet a third position in which it extends upwardly from the rail gear behind the tailgate of the maintenance truck. The arms can be mechanically latched in these upright positions, and the vehicle can be driven on roads and highways without fear of the arms being damaged. The applicator arms are independent of one another and are pivoted up and down by independent air cylinders, so that each arm can be activated to grease a rail while the other arm remains inactive in the raised position.

Another important feature of the invention is the provision of a heating system for heating the grease cannisters in cold weather. The cannisters are contained in an enclosed compartment, and the heating system extracts heat from the engine of the truck and heats the compartment in order to keep the grease from becoming too thick to flow adequately in cold weather operation. Accordingly, the rails can be lubricated in cold weather as easily, uniformly and effectively as in warmer weather.

DESCRIPTION OF THE DRAWINGS

In the accompanying drawings which form a part of the specification and are to be read in conjunction therewith and in which like reference numerals are used to indicate like parts in the various views:

FIG. 2 is a fragmentary top plan view showing the components of the lubricating device which are mounted on the rail gear of the maintenance truck, with one of the applicator arms in the raised position and the other in the lowered position;

FIG. 3 is a fragmentary elevational view taken generally along line 3—3 of FIG. 2 in the direction of the arrows;

FIG. 4 is a fragmentary sectional view taken generally along line 4—4 of FIG. 3 in the direction of the arrows, with the broken lines illustrating the fully raised position of the applicator arm for over the road travel of the maintenance vehicle; and FIG. 5 is a fragmentary sectional view on an enlarged scale taken generally along line 5—5 of FIG. 3 in the direction of the arrows, with the broken lines illustrating the position of the control cylinder when the applicator arm is in its fully raised position.

DETAILED DESCRIPTION OF THE INVENTION

Figure 1:
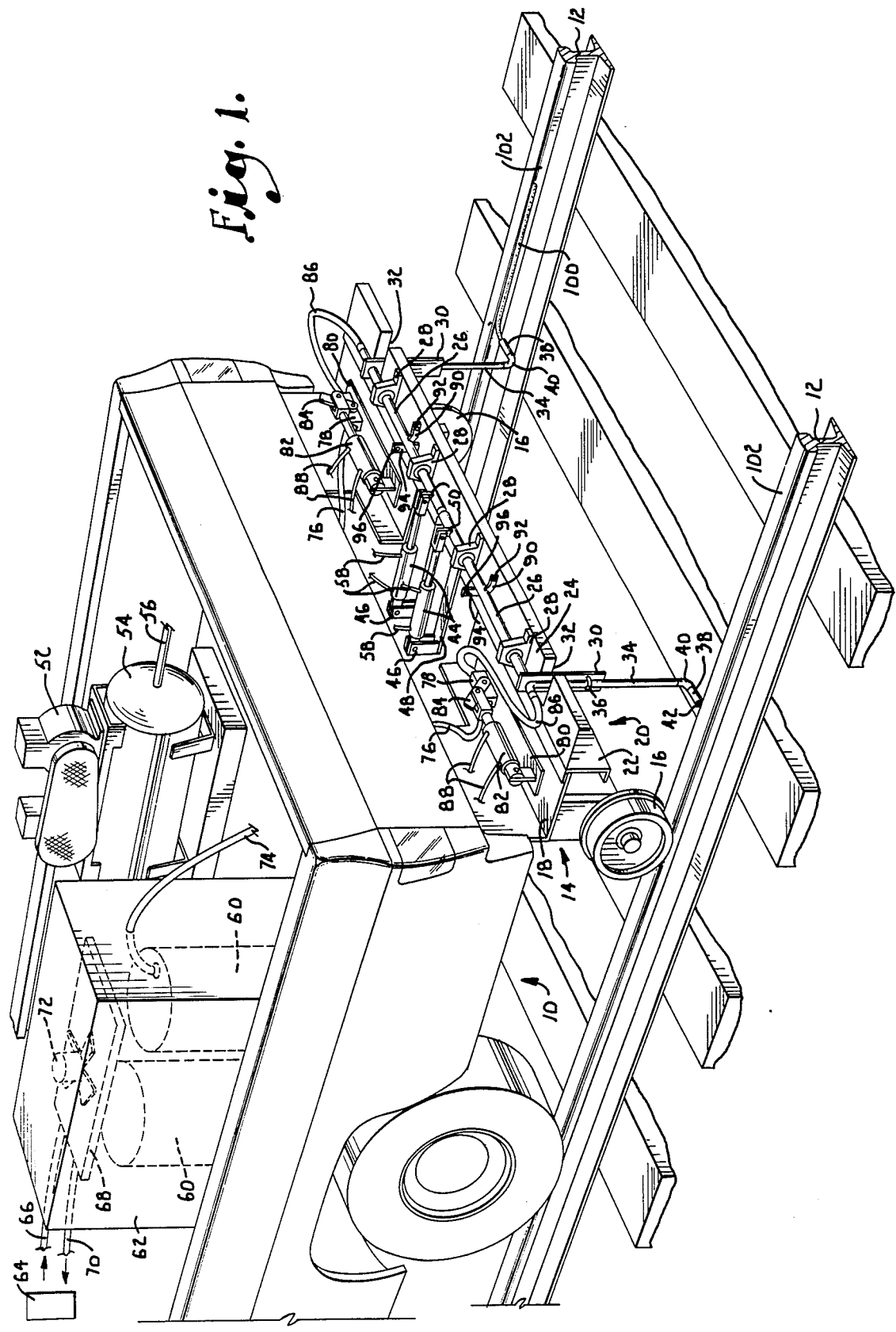
FIG. 1 is a perspective view showing a track maintenance truck equipped with a rail lubricating device constructed according to a preferred embodiment of the present invention, with both of the applicator arms in the lowered operating positions.

Referring now to the drawings in more detail and initially to FIG. 1, numeral 10 generally designates a conventional track maintenance truck which may be driven along the rails 12 of a railroad track in order to perform track maintenance and inspection work. Numeral 14 generally designates rail gear which is mounted on the bumper of the truck 10 and which includes flanged wheels 16 that travel on the rails 12. The rail gear 14 is conventional and includes various other components which permit the rail gear to carry out various operations. The rail gear 14 includes a horizontal plate 18 which projects rearwardly from the bumper of the truck.

The rail lubrication device of the present invention includes a special frame which is generally designated by numeral 20. Frame 20 includes a channel 22 which is bolted or otherwise secured to the back edge of the plate 18 of the rail gear. A flanged plate 24 is in turn secured to channel 22 by welding or in another suitable manner.

A pair of horizontal shafts 26 are mounted for rotation on plate 24. The shafts 26 are coaxial with one another and are arranged end to end, and each shaft is supported for axial rotation by a pair of bearings 28. Secured to the outer end of each shaft 26 is a mounting plate 30. The mounting plates 30 project through slots 32 which are formed in plate 24, and each plate 30 carries a rigid applicator arm 34. A pair of U bolts 36 serve to rigidly connect each applicator arm 34 with the corresponding mounting plate 30. The applicator arms 34 are hollow pipes which serve to apply lubricant to the rails 12. On the end remote from its shaft 26, each applicator arm 34 is equipped with a nozzle 38 which is connected with the applicator arm by an elbow 40. The nozzles 38 are oriented at 90° to the applicator arms, and each nozzle 38 has a small discharge port 42 in its free end.

A pair of independent pneumatic cylinders 44 serve to axially rotate the respective shafts 26 through an arc of 90°. As each shaft 26 rotates, it carries the corresponding applicator arm 34 between the raised horizontal position shown for the left hand arm in FIG. 2 and the lowered operating position shown for the right hand arm in FIG. 2. Each cylinder 44 has its base end pivoted between a pair of lugs 46 which are secured to a plate 48. Plates 48 are in turn mounted to channel 22. The rod 49 of each cylinder 44 is pivoted to a lug 50 which projects outwardly from the corresponding shaft 26. Rods 49 are connected with lugs 50 at locations offset from the common axis of shafts 26, so when the rod 49 of each cylinder is extended, the corresponding shaft 26 is rotated to pivot arm 34 in the lowered position. Conversely, retraction of the rod of each cylinder raises each applicator arm 34 to the raised position in which the arm extends horizontally to the rear from shaft 26.

Cylinders 44 and the other pneumatic components in the system are powered by an air compressor which includes a gasoline engine 52 and a compressor tank 54 mounted in the bed of truck 10. Compressed air from tank 54 is supplied through a main pneumatic line 56. Line 56 connects through suitable control valves (not shown) with the pneumatic lines 58 which supply air to cylinders 44 for extension and retraction of their rods 49. The pneumatic lines 58 may be equipped with in line pressure regulators (not shown) which prevent the cylinders from lowering arms 34 too rapidly.

The lubricant which is applied to the rails 12 is contained in a pair of cannisters 60. The cannisters 60 are located within an enclosed compartment formed within an insulated box 62 which is carried in the bed of the truck 10. The interior of box 62 is heated using heat generated by the vehicle engine which is shown schematically at 64. The engine heat is extracted by fluid which is circulated through a hose 66 that leads to a heating coil 68 located with box 62. The fluid is returned to the engine through another hose 70. An electric fan 72 circulates air past the heating coil 68 in order to extract its heat and thereby heat the grease within the cannisters 60.

An air powered pump (not shown) pumps the lubricant from cannisters 60 through a main grease line 74. The main grease line 74 branches into a pair of lines 76 which extend to respective ball valves 78. One of the ball valves 78 controls the flow of grease to each of the applicator arms 34.

Each ball valve 78 is carried on a mounting plate 80 which also supports a pneumatic cylinder 82. Each cylinder 82 has its base end pivoted to a lug on plate 80 and its rod end pivoted to a lever 84. The levers 84 control valves 78. In the retracted position of cylinder 82, the corresponding lever 84 is in a position to close the corresponding valve 78. When cylinder 82 is extended, lever 84 is pivoted in a direction to open its valve 78. In the open position, grease is able to flow from line 76 through the valve and then through another flexible line 86 which connects with the corresponding applicator arm 34. Each valve 82 has a pair of pneumatic lines 88 which connect through suitable control valves (not shown) with the main pneumatic line 56.

The cylinders 44 are independent of one another, and they are also independent of cylinders 82. It is contemplated that the controls which operate the control valves for the pneumatic system will be located in the cab of the truck 10 so that the lubrication of the rails can be carried out from the cab by the driver of the truck. Each cylinder 82 can be controlled in a manner independent of all the other cylinders, so that each cylinder 44 can be activated to raise or lower the corresponding applicator arm 34 independently of the other arm. Similarly, each cylinder 82 can be extended or retracted to open or close the corresponding grease valve 78 independently of the other valve.

For over the road travel of the vehicle 10, each applicator arm 34 has an upright position which is shown in broken lines in FIG. 4. In the upright position, the arm 34 extends upwardly from its shaft 26. From the horizontal position for travel over the rails 12, the applicator arms 34 can be manually raised to the upright positions, and this moves the corresponding cylinder rod 49 to the broken line position shown in FIG. 5. Each shaft 26 has a projecting latch plate 90 which is provided with an opening 92 in its outer end. A pair of bracket plates 94 extend upwardly from plate 24, and each bracket 94 is provided with an opening 96 near its top end. As best shown in FIG. 4, the latch plates 90 and bracket plates 94 are located such that the openings 92 and 96 register whenever the applicator arm is raised to the upright position. A removable latch pin 98 can be inserted through the aligned openings 92 and 96, and the pin then latches arm 34 in the upright position for over the road travel.

In operation, the applicator arms 34 are normally raised to their horizontal position when vehicle 20 is traveling along the rails 12. When one or both of the rails 12 are to be lubricated, the controls are operated from the cab of the vehicle in order to lower the appropriate arm or arms to the lowered position. It is contemplated that only the rail on the "high side" (outside) of a curved area of the track will be lubricated, since friction between the wheels and rails is greatest here. Thus, if the track shown in FIG. 1 is curving to the left, only the applicator arm 34 on the right side of the vehicle (viewed from the rear) will be lowered. This is accomplished by extension of the right cylinder 44. The valve control cylinder 82 is also extended in order to open its valve 78 and provide a flow path for the grease to the applicator arm. The grease discharges from the nozzle 38 in a bead 100 (see FIG. 1) which is applied uniformly to the inside edge of the ball or top flange 102 of the right hand rail 12.

The bead 100 is normally applied along the entire curved area of the track. When the end of the curve is reached, the application of lubricant is discontinued by retracting cylinder 82 in order to close valve 78, thereby cutting off the flow of grease to the applicator arm. Arm 34 is then raised by retracting cylinder 44, and the vehicle can then continue its travel along the rails 12.

During cold weather, the heating system is activated in order to heat the grease contained within the cannisters 60. Heating of the grease maintains it in a condition to freely flow through the grease lines and the applicator arms 34, and the application of lubricant in the winter is thus carried out as effectively and uniformly as occurs in warmer weather.

Because only the high side of the rail on curved areas of the tracks normally receives grease, only one applicator arm 34 is active at any one time under normal operating conditions. This is easily accomplished because all of the cylinders 44 and 82 are independent of one another, and one arm can be lowered with its valve open while the other arm remains raised with its valve closed. However, it is to be noted that the invention can be operated to apply grease to straight areas of the track and can be operated to apply lubricant to both rails 12 at the same time.

It has been found that good results are obtained by lubricating the track approximately two times a week during the winter and approximately three times a week during the summer, although this can vary depending upon the frequency of trains traveling along the track and other conditions. It is contemplated that the track will be lubricated during routine inspections of the track which must be carried out in any event with the vehicle 10. Consequently, special trips are not necessary to carry out lubrication of the track, and no additional manpower or time is required for the application of lubricant since the track inspector can operate the lubricant system as well as carry out his normal inspection activities. A single track inspector can cover a long stretch of track with a single lubrication device, and this is advantageous as compared to stationary wayside lubricators which are needed in large numbers because one is required at each curve that is to be lubricated.

It has been found that the curves on a typical stretch of track 150 miles long can be lubricated per day by the lubricating device. This normally requires approximately 45 gallons of lubricant per day. The cannisters 60 preferably have a capacity of 30 gallons each, and this provides a total grease supply of 60 gallons which is ample for a single day's lubricating operation.

By raising the applicator arms 34 to the horizontal position during travel of the vehicle 10 along the track, the applicator arms are carried in an out of the way position and are raised far enough that they are not subject to damage from obstacles that may be encountered. During travel of the vehicle 10 on highways and other roads, the applicator arms 34 are both raised to the upright position and latched in place by applying the latch pins 98. The latching arrangement maintains the arms in the upright positions while the vehicle is driven over the road. When the arms are needed again for the application of grease, they are unlatched and manually lowered to the horizontal position, and cylinders 44 can then be used in the manner indicated previously to move the arms between the horizontal and lowered positions.

The components which are mounted to the rail gear 14 do not interfere with the normal functioning of the rail gear or with any other equipment. At the same time, these components are situated at convenient locations for applying grease to the rails. The components which are mounted in the truck bed occupy a relatively small amount of room and leave the rest of the bed available for carrying other tools and equipment. If desired, the compressor tank 54 can be located in a tool box on the truck bed.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, I claim:

1. A rail lubrication device for use with a vehicle adapted to travel both over the road and along a pair of rails, said device comprising:
   a frame adapted for mounting on the vehicle at a preselected location;
   a grease container on the vehicle containing a supply of grease;
   a pair of applicator arms for applying grease to the respective rails;
   means for mounting each arm on said frame at spaced apart locations for pivotal movement about a substantially horizontal axis among an upright position wherein the arm extends generally above said axis for travel over the road, a generally horizontal position wherein the arm extends generally to the rear of said axis for travel along the rails, and a lowered position wherein the arm extends generally below said axis for applying grease to the corresponding rail, said mounting means comprising a shaft for each arm, said shafts being mounted for axial rotation on the frame and being coaxial with said axis, and means for coupling each arm with the corresponding shaft for rotation therewith among the upright, horizontal and lowered positions;

an outlet for each arm located adjacent the corresponding rail in the lowered position of the arm;
a grease supply line for each arm extending thereto from said container;
a valve in each supply line for opening and closing same;
power means for moving each arm between the horizontal position and the lowered position;

a latch plate projecting from each shaft;
a pair of brackets on the frame, each bracket being located adjacent the corresponding latch plate in the upright position of the corresponding arm; and
a removable fastener for securing each latch plate to the corresponding bracket, thereby latching the corresponding arm in the upright position.

* * * * *